WHIPPLETREE LINKAGE UTILIZED TO POSITION A TRANSDUCER
Original Filed July 28, 1964
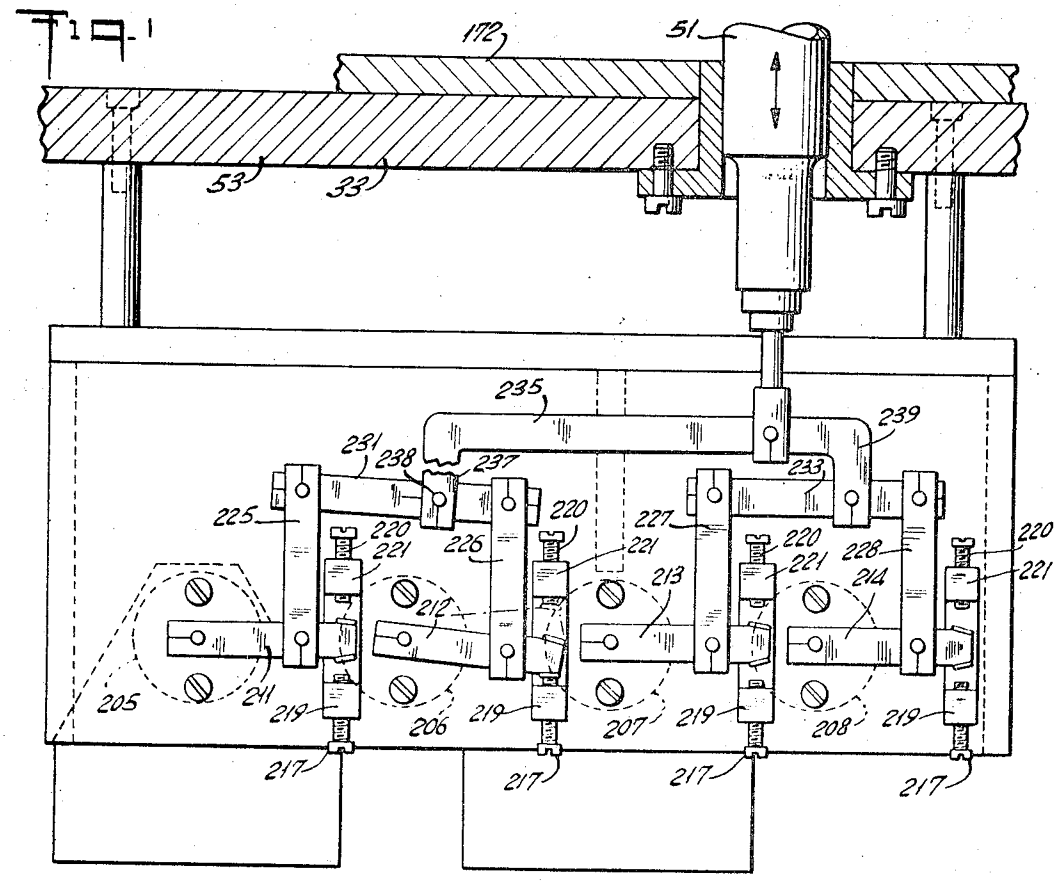
Fig. 2
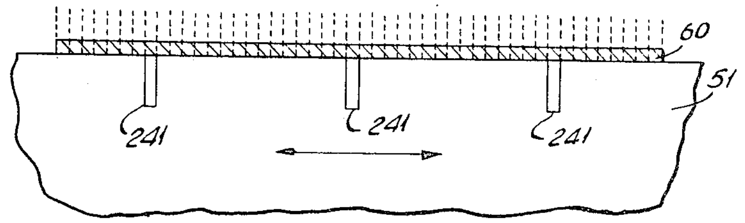
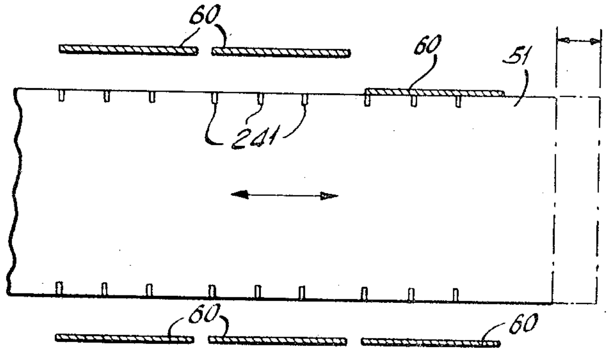
Fig. 3
INVENTOR.
ANDREW GABOR United States Patent Office 3,546,685

Patented Dec. 8, 1970

3,546,685
WHIPPLETREE LINKAGE UTILIZED TO POSITION A TRANSDUCER

Andrew Gabor, Bedford, Mass., assignor to Potter Instrument Company, Inc., Plainview, N.Y., a corporation of New York Original application July 28, 1964, Ser. No. 385,727, now Patent No. 3,378,826, dated Apr. 16, 1968. Divided and this application Mar. 8, 1968, Ser. No. 711,666
Int. Cl. G11b *21/08*
U.S. Cl. 340—174.1 2 Claims

ABSTRACT OF THE DISCLOSURE

A transducer positioning mechanism consisting of rotary solenoids and interconnecting linkage. Actuation of selected solenoids, because of the linkage utilized, imparts differing amounts of linear movement to the transducer to position the transducer at a selected position.

BACKGROUND OF THE INVENTION

This invention relates generally to information storage devices, and, more particularly, to an improved transducer positioning mechanism for magnetic tape random access information memory system. This application is a division of application Ser. No. 385,727, filed July 28, 1964, now U.S. Pat. No. 3,378,826.

Random access memories are used in digital computers and other data processing equipment to store information to be used or operated upon by data processing equipment and to provide such stored information to the data processing equipment quickly from any selected random location or "address" in the memory. The random access memories prior to the present invention, for given capacities of stored information, require too much time to find a selected address at random and to read the information out from the selected address, or other mechanical limitations have made them impractical.

One object of this invention is to provide and include transducer positioning mechanism for positioning transducer with respect to a selected magnetic recording track.

SUMMARY OF THE INVENTION

Briefly, this invention contemplates the provision of a binary lever adder whose output is directly coupled to to a transducing head that carries a plurality of individual transducers. This arrangement permits a particular transducer to be positioned with respect to a selected recording track quickly and efficiently.

BRIEF DESCRIPTION OF THE DRAWINGS

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views;

FIG. 1 is a plan view of a lever adder head positioning mechanism of this invention;

FIG. 2 is a greatly enlarged view of a recording medium in transducing relationship with certain transducers carried by the transducing head; and FIG. 3 is another enlarged view of the transducer head, similar to that of FIG. 2 but showing additional transducers and recording medium.

DESCRIPTION OF THE PREFERRED EMBODIMENTS

Referring now to FIG. 1, the lever adder or whippletree mechanism, which controls the positioning of the cylindrical head carrier, comprises four rotary solenoids 205, 206, 207, and 208. The rotary solenoids 205 through 208 drive the crank arms 211 through 214, respectively, and operate to position the crank arms 211 through 214 either in a first position or in a second position.

The crank arms are disposed generally along a line perpendicular to the axis of the cylindrical head carrier 51. In their first positions, the crank arms 211 through 214 engage the ends of the screws 217, which are threaded through the blocks 219. By turning the screws 217 in the blocks 219, the first positions of the crank arms 211 through 214 can be adjusted individually.

The crank arms 211 through 214 engage the ends of screws 220 when the crank arms are in their second positions. The screws 220 are threaded into blocks 221, and by turning the screws 220 in the blocks 221, the second positions of the crank arms 211 through 214 can be adjusted individually. Between their first and second positions, the ends of the crank arms 211 through 214 are moved generally parallel to the axis of the head carrier 51.

The crank arms 211 through 214 are of equal lengths, and the links 225 through 228 are connected pivotally to points near the ends of the crank arms 211 through 214, respectively. The radial distances along each crank arm from their axes to the points where the links are connected are equal. The link 225 extends perpendicularly away from the crank arm 211, and the other end of the link 225 is connected pivotally to the end of a link 231 disposed generally parallel to the crank arm 211 and generally perpendicular to the axis of the head carrier 51.

The link 226 extends perpendicularly away from the crank arm 212, and the other end of the link 226 is connected pivotally to the other end of the link 231. As a result, one end of the link 231 will move back and forth between two positions corresponding to the movement of the crank arm 211 between its first and second positions, and the other end of the link 231 will move back and forth between two positions corresponding to the movement of the crank arm 212 between its first and second positions.

The movement of the ends of the link 231 generally will be parallel to the axis of the head carrier 51. The link 227 extends perpendicularly away from the crank arm 213, and the other end of the link 227 is connected pivotally to one end of a link 233 disposed generally parallel to the crank arm 213 and generally perpendicular to the axis of the head carrier 51. The other end of the link 233 is connected to the other end of the link 228, which extends perpendicularly away from the crank arm 214.

Thus, one end of the link 233 will be moved back and forth between two positions corresponding to the movement of the crank arm 213 between its first and second positions, and the other end of the link 233 will move back and forth between two positions corresponding to the movement of the crank arm 214 between its first and second positions. The movement of the ends of the link 233 will be generally parallel to the axis of the head carrier 51.

A link 235 extending generally parallel to the links 231 and 233 has a projection 237 at one end connected pivotally to the link 231 at a point 238 between the points where the links 225 and 226 are connected to the link 231. On the other end, the link 235 has a projection 239 connected pivotally to the link 233 at a point 240 between the points where the links 227 and 228 are connected to the link 233.

The pivot point 238 on the link 231 is two-thirds of the way from the point at which the link 225 is connected to the point where the link 226 is connected. The pivot point 240 on the link 233 is two-thirds of the way from the point at which the link 227 is connected to the point where the link 228 is connected. The pivot points 238 and 240 lie along a line generally perpendicular to the axis of the head carrier 51, and the distance between the pivot points 238 and 240 is one and two-thirds times the length of the links 231 and 233, which are of equal length.

The cylindrical head carrier extends through the mounting plate 172 and the supporting wall 33 and is mounted slidably for axial movement in the wall 33 and plate 172. The end of the cylindrical head carrier is connected pivotally to the link 235 at a point four-fifths of the way from the end of the link 235 connected to the link 231 to the end of the link 235 connected to the link 233. With this arrangement the head carrier can be moved axially to any one of sixteen incremental positions.

Movement of the crank arm 211 between its first and second positions will cause a change in the axial position of the head carrier of one incremental position. Movement of the crank arm 212 between its first and second positions will cause a change in the axial position of the head carrier of two incremental positions. Movement of the crank arm 213 between its first and second positions will cause a change in the axial position of the head carrier of four incremental positions, and movement of the crank arm 214 between its first and second positions will cause a change in the axial position of the head carrier of eight incremental positions.

Thus, by properly positioning the crank arms 211 through 214, any one of the sixteen incremental axial positions of the head carrier may be selected.

For example, the head carrier has three transducing heads for each recording medium, such as a magnetic tape. The transducing heads are designated by the reference number 241.

During a transducing operation, a tape on which the transducing operation is to be carried out will be positioned adjacent the head carrier as exemplified by the upper right-hand tape 60 in FIG. 3. Other tapes upon which no transducing operation is to be carried may be positioned spaced away from the head carrier as exemplified by the remaining tapes shown in FIG. 3.

As illustrated in FIG. 2, there may be forty-eight recording tracks arranged side by side across the tape 60. By moving the head carrier to its different axial positions, the recording head 241 opposite the left side of the tape can be moved to record or reproduce from any one of the sixteen tracks on the left side of the tape, the middle transducing head 241 can be moved to record or reproduce from any one of the middle sixteen tracks on the tape, and the transducing head 241 opposite the right side of the tape can be moved to record or reproduce from any one of the sixteen tracks on the right side of the tape.

The selection of the particular one transducing head, out of the three transducing heads which are opposite the selected tape, is made electronically. Thus, in the system of the present invention, the selection of one of the forty-eight tracks on the tape is made by mechanically positioning the head carrier by means of the whippletree mechanism and electronically selecting one of the three transducing heads opposite the selected tape.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A random access information memory device comprising:
a storage medium,
a transducing head operable to perform transducing operations on said storage medium,
means to drive said storage medium past said transducing head in transducing relationship therewith,
a plurality of control means each operable to move an output member selectively between first and second positions,
a whippletree linkage interconnecting the output members of said control means with said transducing head to position said transducing head adjacent a different track on said storage medium for each different permutation of said output members in their first and second positions,
said whippletree linkage including,
a link pivotally connected to said transducing head at a point between the ends of said link, said link extending generally perpendicular to the direction in which said transducing head is transversely movable,
means to move one end of said link selectively between different positions in a direction generally parallel to the direction in which said transducing head is transversely movable, and
means to move the other end of said link selectively between different positions in a direction generally parallel to the direction in which said transducing means is transversely movable.

2. A memory device as recited in claim 1 wherein the point on said link at which said transducing head is pivotally connected is positioned between the midpoint of said line and one end of said link.

References Cited

UNITED STATES PATENTS

| | | | |
|---|---|---|---|
| 3,052,874 | 9/1962 | Krakinowski et al. | 340—174.1 |
| 3,314,057 | 4/1967 | Mogtader | 340—174.1 |
| 3,349,381 | 10/1967 | Handley | 340—174.1 |

BERNARD KONICK, Primary Examiner

V. P. CANNEY, Assistant Examiner

U.S. Cl. X.R.

179—100.2